United States Patent [19]

Komatsu

[11] Patent Number: 4,940,281
[45] Date of Patent: Jul. 10, 1990

[54] FRONT BODY STRUCTURE OF VEHICLE

[75] Inventor: Nobuhiro Komatsu, Hiroshima, Japan

[73] Assignee: Mazda Motor Corporation, Hiroshima, Japan

[21] Appl. No.: 270,024

[22] Filed: Nov. 14, 1988

[30] Foreign Application Priority Data

Nov. 18, 1987 [JP] Japan ............................... 62-176103
Nov. 18, 1987 [JP] Japan ............................... 62-176104

[51] Int. Cl.⁵ .......................... B60Q 1/05; B60R 27/00
[52] U.S. Cl. ..................................... 296/194; 362/65; 362/70
[58] Field of Search ....................... 296/193, 194, 203; 362/66, 70, 65

[56] References Cited

U.S. PATENT DOCUMENTS

| | | | |
|---|---|---|---|
| 4,380,789 | 4/1983 | Craig | 362/66 X |
| 4,432,040 | 2/1984 | Matsuura et al. | |
| 4,437,143 | 3/1984 | Hayashi et al. | |
| 4,542,934 | 9/1985 | Komatsu et al. | 296/194 |
| 4,630,179 | 12/1986 | Yukimoto et al. | 362/66 |

FOREIGN PATENT DOCUMENTS

| | | | |
|---|---|---|---|
| 163974 | 12/1981 | Japan | 296/194 |
| 148775 | 8/1985 | Japan | 296/194 |
| 60-163135 | 10/1985 | Japan | |
| 41640 | 2/1986 | Japan | 362/65 |
| 61-78045 | 5/1986 | Japan | |
| 91379 | 4/1987 | Japan | 296/194 |

Primary Examiner—Margaret A. Focarino
Assistant Examiner—Gary C. Hoge
Attorney, Agent, or Firm—Fleit, Jacobson, Cohn, Price, Holman & Stern

[57] ABSTRACT

A front body structure of a vehicle includes a pair of retractable head lamps, a pair of retractable head lamp covers for covering the retractable head lamps, a pair of drive motors for driving the retractable head lamps and the retractable head lamp covers, a radiator shroud upper member disposed on a front side of an engine compartment and extending laterally with respect to a vehicle body, a cross member disposed below the radiator shroud upper member and extending laterally with respect to the vehicle body, and two side connecting members for connecting the radiator shroud upper member with the cross member, each of the drive motors being mounted on one of the side connecting members. The thus constructed front body structure has advantages in that it is possible to prevent the number of parts for mounting the drive motors from being increased and it is possible to markedly increase the rigidity of the portions on which the drive motors are mounted, since each of the drive motors is mounted on one of the side connecting members secured to the radiator shroud upper member and the cross member which are standard members for constructing the front body of a vehicle and have extremely high rigidity.

10 Claims, 6 Drawing Sheets

FRONT BODY STRUCTURE OF VEHICLE

BACKGROUND OF THE INVENTION

The present invention relates to a front body structure of a vehicle and, particularly, to a front body structure of a vehicle provided with retractable head lamps.

DESCRIPTION OF PRIOR ART

There are known vehicles provided with retractable head lamps which can be moved by drive means including a motor so as to be projected from the upper surface of a front body of a vehicle when they are to be turned on and be retracted into the front body of the vehicle when they are to be turned off.

Publicly disclosed Japanese Utility Model Application No. 60 (1985)-163135 discloses a front body structure of a vehicle in which the retractable head lamps are mounted on a bracket provided for being exclusively used to mount the retractable head lamps thereon and publicly disclosed Japanese Utility Model Application No. 60 (1985)-78045 discloses a front body structure of a vehicle in which the drive means for driving the retractable head lamps is mounted on a bracket provided for being exclusively used to mount the drive means thereon.

However, it is not preferable and should be avoided to provide such a bracket to be exclusively used for mounting the retractable head lamps or the drive means therefor, since the number of parts is increased and space is required for arranging such brackets in the front body of the vehicle.

SUMMARY OF THE INVENTION

It is therefore an object of the present invention is to provide a front body structure of a vehicle capable of mounting drive means for driving retractable head lamps on the front body of the vehicle by utilizing standard members employed for constructing the front body of the vehicle, while increasing the rigidity of the front body of the vehicle.

Another object of the present invention is to provide a front body structure of a vehicle capable of mounting retractable head lamps and drive means for driving the retractable head lamps on the front body of the vehicle by utilizing standard members employed for constructing the front body of the vehicle, while increasing the rigidity of the front body of the vehicle.

According to the present invention, the above and other objects can be accomplished by a front body structure of a vehicle comprising a pair of retractable head lamp members, a pair of drive means for driving said retractable head lamp members, a radiator shroud upper member disposed on a front side of an engine compartment and extending laterally with respect to a vehicle body, a cross member disposed below said radiator shroud upper member and extending laterally with respect to the vehicle body, and at least two connecting means for connecting said radiator shroud upper member and said cross member, each of said drive means being mounted on one of said connecting means.

In a preferred aspect of the present invention, each of said retractable head lamp members is further mounted on a closed cross-section portion extending laterally with respect to the vehicle body and formed by connecting said radiator shroud upper member with one of radiator shroud side panels disposed below said radiator shroud upper member and on a side of the vehicle body.

The above and other objects and features of the present invention will become apparent from the following description made with reference to the accompanying drawings.

DESCRIPTION OF THE PREFERRED EMBODIMENTS

Figure 1:
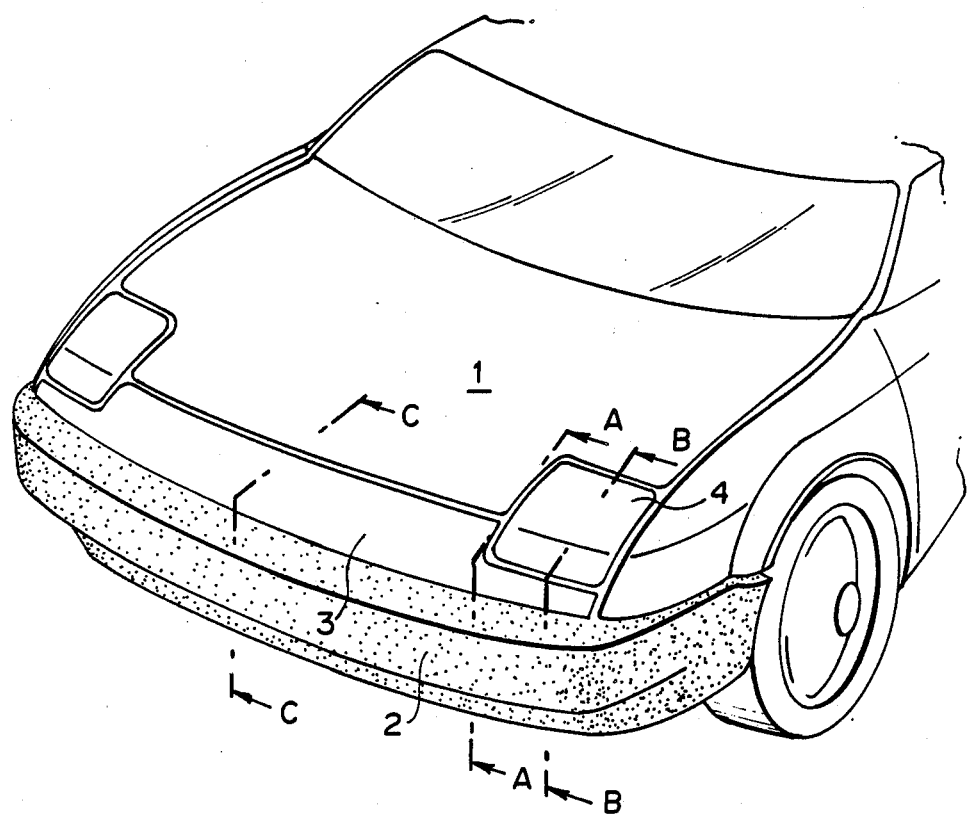
FIG. 1 is a schematic drawing showing a front view of a vehicle body having a front body structure which is an embodiment of the present invention.
Figure 2:
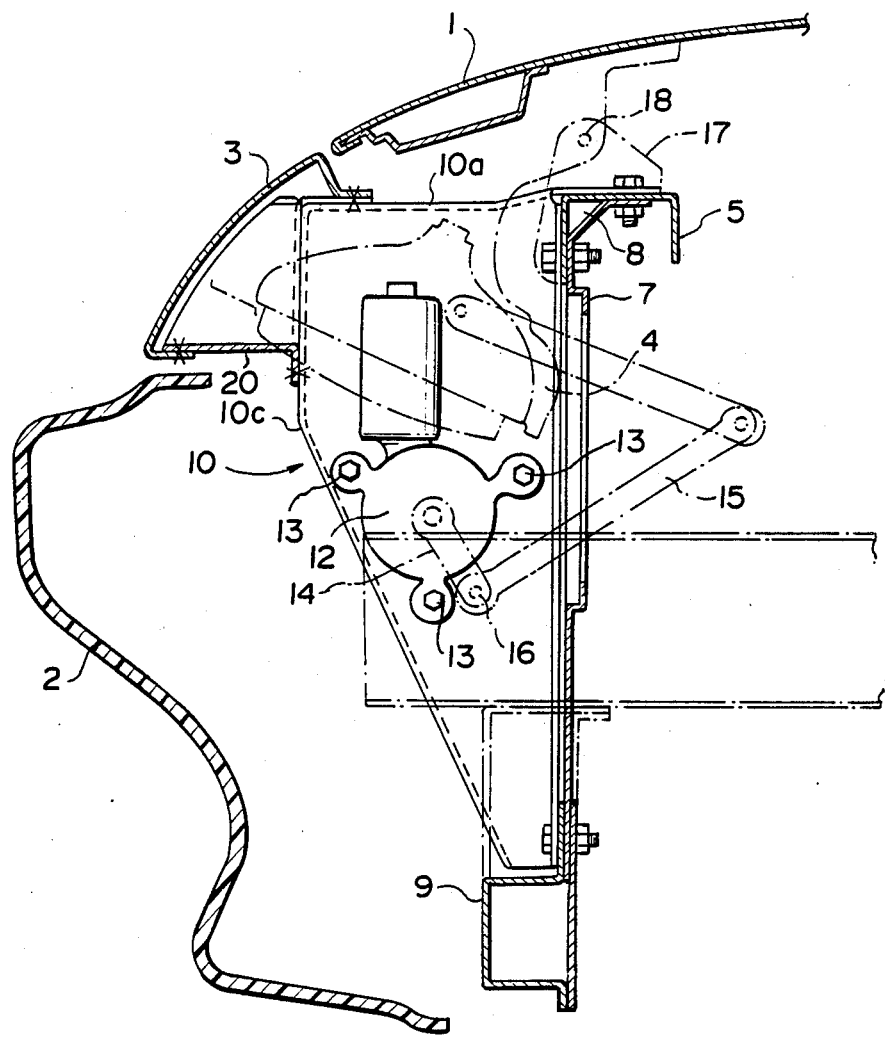
FIG. 2 is a schematic drawing showing a cross sectional view taken on line A—A of FIG. 1.
Figure 3:
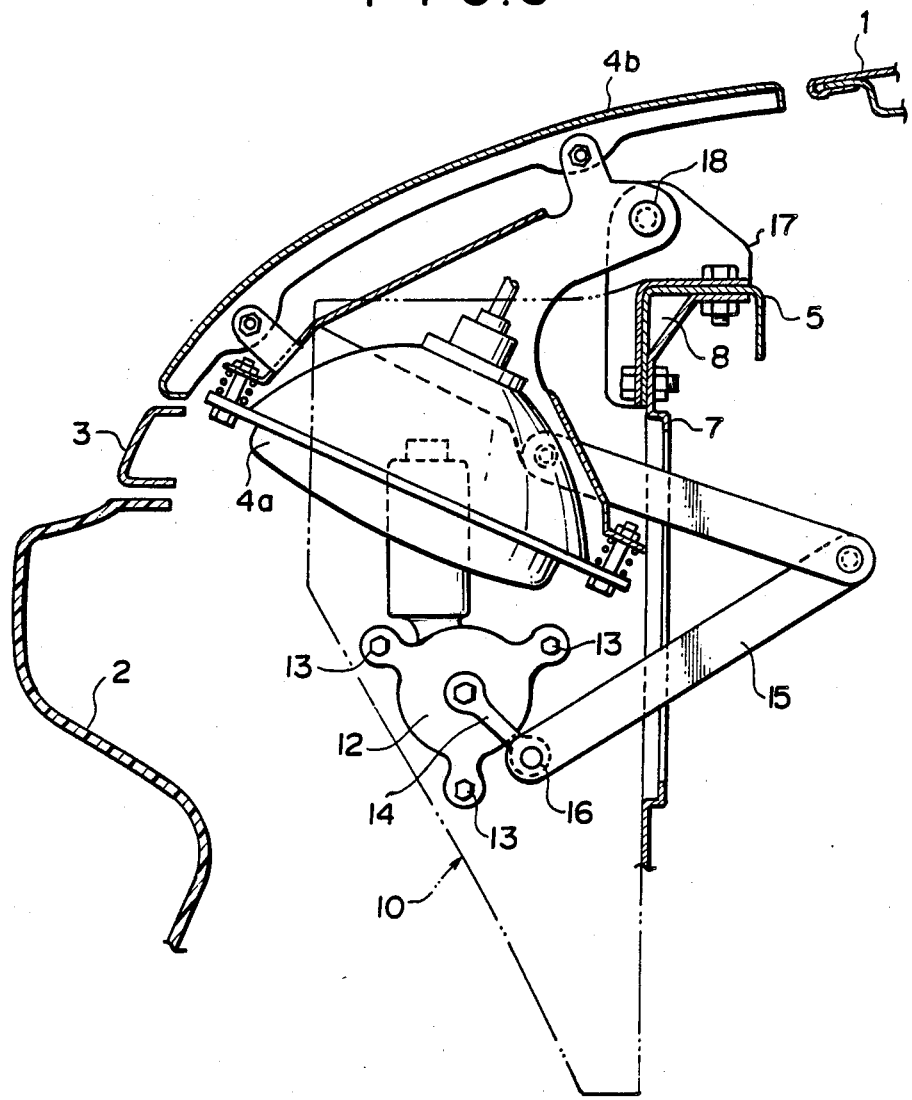
FIG. 3 is a schematic drawing showing a cross sectional view taken on line B—B of FIG. 1.

Referring to FIGS. 1 to 3, a body panel 3 is provided between a bonnet 1 and a front bumper 2 and a retractable head lamp member 4 consisting of a retractable head lamp 4a and a head lamp cover 4b for covering the retractable head lamp 4a is provided between the bonnet 1 and the front bumper 2 at a corner of a front portion of a vehicle body so that a smooth surface is formed by the bonnet 1, the body panel 3 and the retractable head lamp cover 4b when the retractable head lamp member 4 is retracted into the vehicle body.

Figure 4:
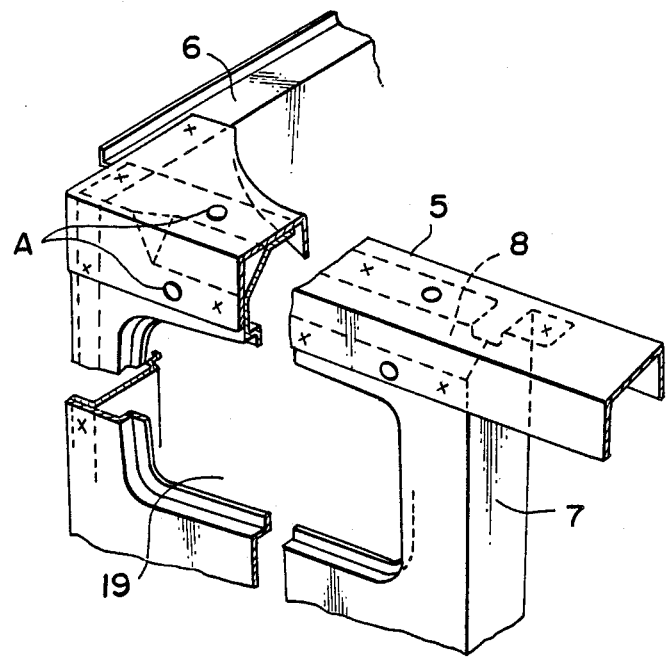
FIG. 4 is a schematic drawing showing a perspective view of a radiator shroud upper member and a radiator shroud side panel at a right portion of a front body in an embodiment of the present invention.

As shown in FIGS. 2 to 4, a radiator shroud upper member (hereinafter referred to as "an upper shroud member") 5 having an inverted U shape is provided on the front side of an engine compartment (not shown) so as to extend laterally with respect to the vehicle body and connect to wheel aprons 6 at opposite ends thereof. FIGS. 2 to 4 show only the front body structure of the right side portion of the vehicle, it being understood that the left side portion of the vehicle has the same structure as the right side portion thereof. A radiator shroud side panel (hereinafter referred to as "a shroud side panel") 7 is connected to the lower portion of the upper shroud member 5 and the upper shroud member 5 and the shroud side panel 7 are connected so as to form a closed cross section portion 8 extending laterally with respect to the vehicle body as shown in FIGS. 2 and 3, thereby to markedly increase the rigidity of the connecting portion of the upper shroud member 5 and the shroud side panel 7.

Figure 6:
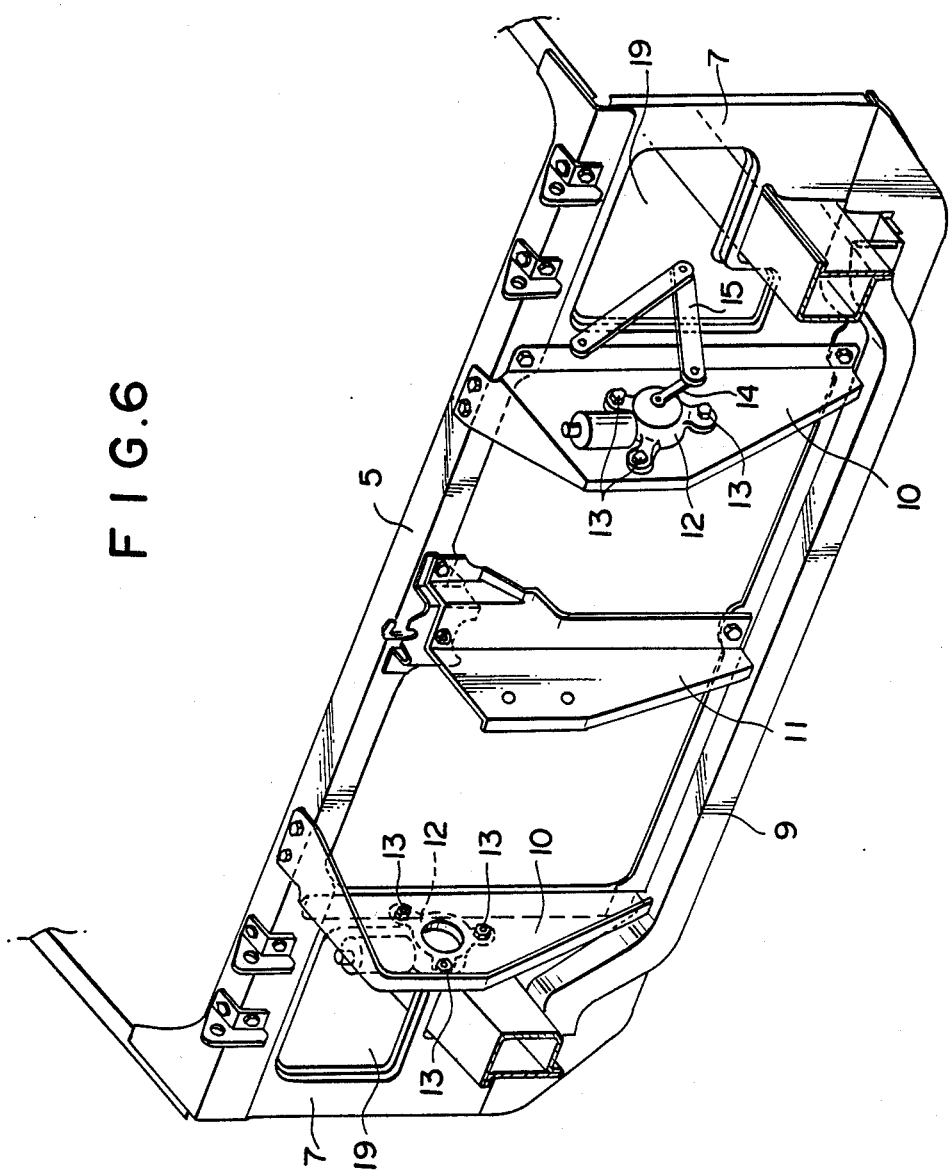
FIG. 6 is a schematic drawing showing a perspective view of a structure consisting of a radiator shroud upper member, a radiator shroud side panel, a cross member, side connecting members, a center connecting member and a driving motor used in an embodiment of the present invention.

As shown in FIGS. 2 and 6, a cross member 9 is provided below the upper shroud member 5 so as to extend laterally with respect to the vehicle body, and side connecting members 10 and a center connecting member 11 are respectively secured to the upper shroud member 5 and the cross member 9, whereby the upper shroud member 5 and the cross member 9 are connected with each other by the side connecting members 10 and the center connecting member 11.

Figure 5:
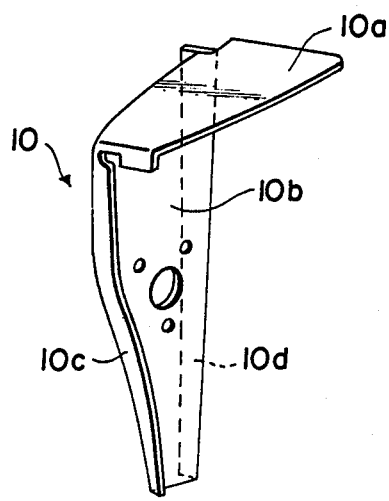
FIG. 5 is a schematic drawing showing a perspective view of a shroud side connecting member used in an embodiment of the present invention.

As clearly shown in FIG. 5, each of the side connecting members 10 consists of an upper flange 10a, a longitudinal flange 10b and side flanges 10c and 10d for increasing the bending rigidity of the side connecting member 10, each of the side flanges 10c and 10d having a smaller width than those of the upper flange 10a and the longitudinal flange 10b.

As shown in FIGS. 2 and 3, a driving motor 12 for moving the retractable head lamp member 4 upward and downward is mounted on the longitudinal flange 10b of the side connecting member 10 by three bolts 13. A motor arm 14 extends from the driving motor 12 and a link 15 is mounted on the motor arm 14 at the end thereof so that the link is pivotable about a shaft 16 at the end of the motor arm 14 opposite to the driving motor 12. The retractable head lamp member 4 is mounted on the other end of the link 15 and also mounted on a bracket 17 mounted on the closed cross section portion 8 formed by the upper shroud member 5 and the shroud side panel 7 so as to be pivotable about a hinge 18. As clearly shown in FIGS. 4 and 6, the upper shroud member 5 and the shroud side panels 7 form openings 19 and each of the links can be moved through one of the openings 19. The body panel 3 is mounted on the upper flange 10a the side connecting member 10 and also mounted through the bracket 17 on the side flange 10c of the side connecting member 10.

Figure 7:
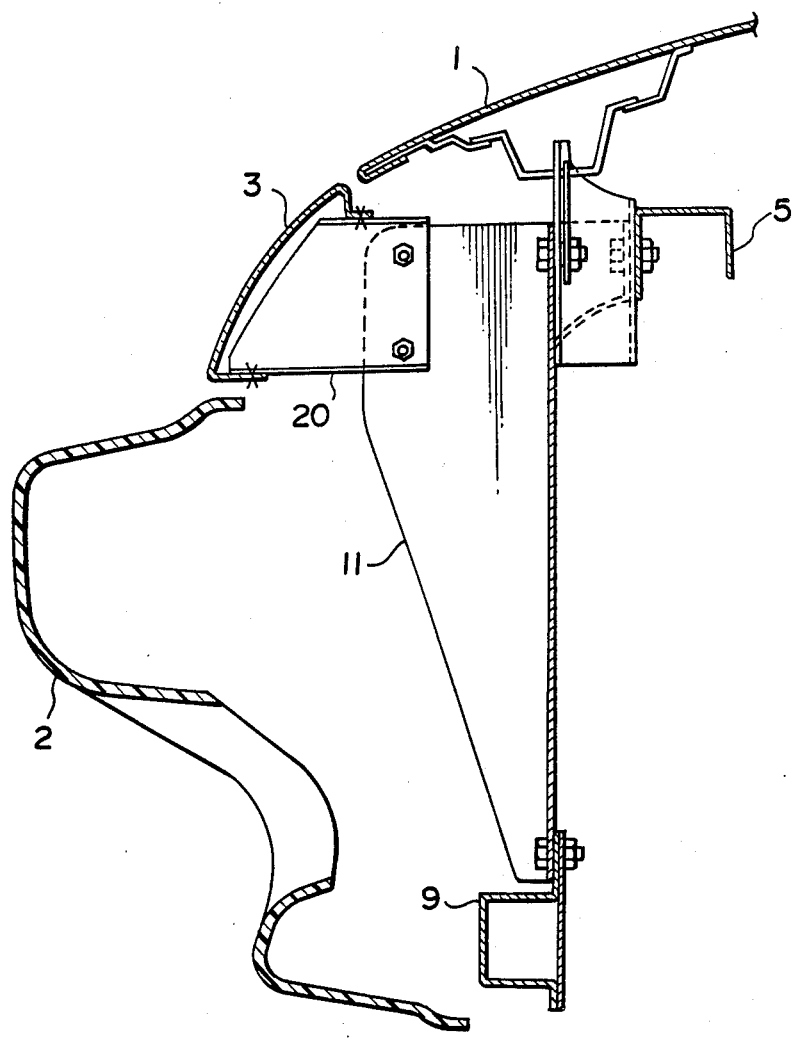
FIG. 7 is a schematic drawing showing a cross sectional view taken on line C—C of FIG. 1.

As shown in FIGS. 6 and 7, the center connecting member 11 is connected to the upper shroud member 5 and the cross member 9 and the body panel 3 is mounted on a bracket 20 secured to the center connecting member 11.

According to the above described embodiment of the present invention, since each of the side connecting members 10 is connected to the upper shroud member 5 and the cross member 9, these two members having extremely high rigidity and being standard members employed for constructing the front body of a vehicle, and each of the driving motors 12 for driving one of the retractable head lamp member 4 is mounted on one of the side connecting member 10, it is possible to efficiently mount the driving motors 12 within the limited space without additional parts for mounting the driving motors 12 on the front body and it is possible to markedly increase the rigidity of the portions on which the driving motors 12 are mounted.

Further, in the above described front body structure, since each of the retractable head lamp members 4 is mounted on one of the closed cross section portion 8 each formed by the upper shroud member 5 and the shroud side panel 7, these two members having extremely high rigidity and being standard members employed for constructing the front body of a vehicle and the rigidity of the closed cross section portion 8 is markedly high, the retractable head lamp members 4 can be mounted efficiently within the limited space without additional parts for mounting the retractable head lamp members 4 on the front body.

Furthermore, according to the above described embodiment of the present invention, the body panel 3 is secured to the side connecting members 10 having high rigidity at both side portions of the front body and is also secured to the center connecting member 11 having high rigidity at the center thereof. It is thus possible to considerably increase the rigidity of the body panel 3.

As described above with reference to the preferred embodiment, according to the present invention, since each of the drive means for driving the retractable head lamp members is mounted on one of the connecting members which connect the upper shroud member having high rigidity with the cross member having high rigidity, the rigidity of the portions where the driving means are mounted and the vicinity thereof can be considerably increased, and since the drive means are mounted on the vehicle body by utilizing the upper shroud member and the cross member, which are indispensable standard members employed for constructing the front body of a vehicle, it is possible to prevent the number of the parts from being increased and to accommodate the drive means within a small limited space.

The present invention has thus been shown and described with reference to the specific embodiments. However, it should be noted that the present invention is in no way limited to the details of the described arrangements but changes and modifications may be made without departing from the scope of the appended claims.

I claim:

1. A front body structure of a vehicle comprising a pair of retractable head lamp members, a pair of drive means for driving said retractable head lamp members, a radiator shroud upper member disposed on a front side of an engine compartment and extending laterally with respect to a vehicle body, a cross member disposed below said radiator shroud upper member and extending laterally with respect to the vehicle body, and at least two connecting means for connecting said radiator shroud upper member with said cross member, each of said drive means being mounted on one of said connecting means.

2. A front body structure of a vehicle in accordance with claim 1 in which two of said connecting means are disposed at the opposite side portions of the vehicle body.

3. A front body structure of a vehicle in accordance with claim 2 in which each of said retractable head lamp members consists of a retractable head lamp and a retractable head lamp cover for covering said retractable head lamp.

4. A front body structure of a vehicle in accordance with claim 3 in which each of said two connecting means extends in substantially the vertical direction and in the longitudinal direction of the vehicle body, whereby flanges are formed on each of which one of said drive means is mounted.

5. A front body structure of a vehicle in accordance with claim 3 which further includes a body panel secured to said connecting means.

6. A front body structure of a vehicle in accordance with claim 5 in which said body panel is disposed between a bonnet and a front bumper.

7. A front body structure of a vehicle in accordance with claim 6 in which each said retractable head lamp cover is arranged so that a smooth surface is formed by said retractable head lamp cover, said bonnet and said front bumper when said retractable head lamp member is retracted into said vehicle body.

8. A front body structure of a vehicle in accordance with claim 3 in which radiator shroud side panels are provided at the opposite side portions of the vehicle body so as to extend in a direction laterally of the vehicle body, closed cross section portions are formed by radiator shroud upper member and said radiator shroud side panels and each of said retractable head lamp members is pivotably mounted on one of said closed cross section portions.

9. A front body structure of a vehicle in accordance with claim 8 which further includes a pair of link means each connecting one of said drive means with one of said retractable head lamp members and in which openings are formed in each radiator shroud side panel each of said openings being able to accommodate one of said link means.

10. A front body structure of a vehicle in accordance with claim 3 which further includes a center connecting means for connecting said radiator shroud upper member and said cross member, said center connecting means being positioned at substantially the center portion with respect to the lateral direction of the vehicle body.

* * * * *